US012186773B2

(12) United States Patent
Hardy et al.

(10) Patent No.: US 12,186,773 B2
(45) Date of Patent: Jan. 7, 2025

(54) TREAD-LINE PAINT APPLICATOR

(71) Applicant: BRIDGESTONE AMERICAS TIRE OPERATIONS, LLC, Nashville, TN (US)

(72) Inventors: Allen D. Hardy, Jackson, SC (US); Edward F. Ford, II, Warrenville, SC (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 32 days.

(21) Appl. No.: 18/164,079

(22) Filed: Feb. 3, 2023

(65) Prior Publication Data

US 2023/0249213 A1 Aug. 10, 2023

Related U.S. Application Data

(60) Provisional application No. 63/308,087, filed on Feb. 9, 2022.

(51) Int. Cl.
*B05C 1/08* (2006.01)
*B05C 1/16* (2006.01)
*B05D 1/28* (2006.01)

(52) U.S. Cl.
CPC ............ *B05C 1/0813* (2013.01); *B05C 1/165* (2013.01); *B05D 1/28* (2013.01)

(58) Field of Classification Search
USPC .......... 118/207, 239, 259, 44; 401/193, 264, 401/208; 156/110.1; 264/164
See application file for complete search history.

(56) References Cited

U.S. PATENT DOCUMENTS 1,988,710 A 1/1935 Beugler
2,528,573 A 11/1950 Beugler
(Continued)

FOREIGN PATENT DOCUMENTS

CN 201659756 U 12/2010
CN 104226549 A 12/2014
(Continued)

OTHER PUBLICATIONS

English Translation CN-106031336 (Year: 2016).*

*Primary Examiner* — Yewebdar T Tadesse
(74) *Attorney, Agent, or Firm* — Nathan I. North; Lucian Wayne Beavers; Patterson Intellectual Property Law, PC

(57) ABSTRACT

A paint applicator apparatus for applying a paint line to a moving strand of a tire component comprising a paint neck and a paint head. The paint neck includes a receiving neck portion, a discharge neck portion, and a paint supply passage. The receiving neck portion extends along a receiving neck portion axis and the discharge neck portion neck portion extends along a discharge neck portion axis. The paint supply passage includes a paint inlet in the receiving neck portion and a paint outlet in the discharge neck portion. The receiving neck portion axis and the discharge neck portion axis define an obtuse angle. The discharge neck portion axis is oriented substantially parallel to the moving strand, and the receiving neck portion axis is oriented upwardly relative to the moving strand. The paint head is coupled to the discharge neck portion and includes a rotatable paint wheel for carrying paint from the paint outlet to the moving strand.

15 Claims, 5 Drawing Sheets

(56) References Cited

U.S. PATENT DOCUMENTS

| | | | |
|---|---|---|---|
| 2,782,757 | A | 2/1957 | Carnes |
| 3,015,301 | A | 1/1962 | Heinrich |
| 4,106,965 | A | 8/1978 | Lee |

FOREIGN PATENT DOCUMENTS

| | | | | |
|---|---|---|---|---|
| CN | 106031336 | A | * | 10/2016 |
| CN | 212092977 | U | | 12/2020 |
| GB | 2370546 | B | | 3/2004 |
| KR | 100665755 | B1 | | 12/2006 |

* cited by examiner

TREAD-LINE PAINT APPLICATOR

BACKGROUND OF THE INVENTION

1. Field of the Invention

The present invention relates generally to a tread-line paint applicator for applying paint to a moving surface in a manufacturing process. More particularly, the present invention relates to applying paint to a tire strand to form a tread-line during the tire manufacturing process.

2. Description of the Prior Art

During the manufacturing process, tire manufacturers produce large volumes of tire strands for a variety of tire products. As such, manufacturers need a way to identify which tire strands belong with which tire product. Tire manufacturers make these identifications by painting tread lines in different colors and configurations that signify a particular tire strand is used for a specific product.

To apply these paint tread lines, tire manufacturers use tread-line paint applicators to apply paint. These tread-line applicators connect to a paint machine that supplies paint to the tread-line applicator. The tread-line paint applicators typically use a paint wheel, similar to the paint applicator disclosed in U.S. Pat. No. 1,988,710 (Beugler), which utilizes a straight neck through which the paint flows. To apply paint to the tire strand, the tire strand is configured to move through the paint machine and the tread-line applicator touches the paint wheel to the moving tire strand. As the wheel rolls along the tire strand, the paint wheel applies paint to the tire strand.

Because these tread-line applicators are straight, and the applicator is gravity fed with paint, the tread-line applicator is held at a substantial angle to the direction of tire strand movement. This configuration frequently causes too much paint to flow onto the tire. The excess paint results in errors in the painted tread line. For example, paint may collect at the deposit location, creating buildup that causes imperfections in the painted line. Some of the buildup may also remain on the paint wheel as it rotates past the tire strand. In this situation, some of the buildup may drip from the paint wheel before the paint is returned to the tread-paint applicator, causing random paint drips along the tire strand that are not part of the intended tread line. Another error results from vapor lock, where air pockets in the tread-paint applicator paint supply create disruptions in the flow of paint to the wheel. When vapor lock occurs, the disruption in the paint flow may cause sporadic or inconsistent tread lines. These errors create imperfections in the painted tread line that may cause subsequent errors in identifying which product the tire strand is intended for and waste paint over time. The errors in the tread line may result in a rework condition, further wasting time in the manufacturing process because the tread line must be fixed or requiring the tire strand with the imperfection to be discarded and wasted.

There is a need for an improved tread-line paint applicator capable of reducing these errors by better regulating the flow of paint to the wheel and returning the excess paint to the tread-line paint applicator without dripping.

SUMMARY OF THE INVENTION

Briefly, the present disclosure relates, in one aspect of the disclosure, to a paint applicator apparatus for applying a paint line to a moving strand of a tire component comprising a paint neck and a paint head. The paint neck includes a receiving neck portion, a discharge neck portion, and a paint supply passage. The receiving neck portion extends along a receiving neck portion axis and the discharge neck portion neck portion extends along a discharge neck portion axis. The paint supply passage is defined through the neck and includes a paint inlet defined in the receiving neck portion and a paint outlet defined in the discharge neck portion. The receiving neck portion axis and the discharge neck portion axis further define an obtuse angle therebetween so that the discharge neck portion axis can be oriented substantially parallel to the moving strand while the receiving neck portion axis is oriented at an upwardly directed angle relative to the moving strand to receive a gravity feed of paint. The paint head is coupled to the discharge neck portion and includes a rotatable paint wheel configured to carry paint from the paint outlet to the moving strand.

In another embodiment the receiving neck portion axis and the discharge neck portion axis define an axial plane of the paint neck and the rotatable paint wheel lies substantially parallel to and in the axial plane and rotates about a wheel axis normal to the axial plane. In some embodiments, the paint outlet includes discharge end opening and a paint outlet slot. The discharge end opening is co-axial with the discharge neck portion axis and communicated with a distal end of the discharge neck portion. The paint outlet slot communicates the discharge end opening with an external surface of the discharge neck portion and lies substantially parallel to and in the axial plane. Further, the rotatable paint wheel extends partially into the paint outlet slot so that when the discharge neck portion is pointed in a direction of travel of the moving strand and the paint wheel is engaged with the moving strand the paint wheel rotates downward out of the paint outlet slot to carry paint from the paint outlet slot down to the moving strand and the paint wheel carries excess paint back up into the paint head.

In some embodiments the paint head includes a paint head slot communicated with the paint outlet slot and the paint wheel further includes opposed parallel wheel sides closely received in the paint head slot so that as the wheel rotates downwardly through the paint head slot paint is primarily carried by a periphery of the paint wheel and paint is wiped off the wheel sides by edges of the paint head slot.

In another embodiment, the obtuse angle is in a range of from about 120 degrees to about 150 degrees. In another embodiment, the obtuse angle is in a range of from about 130 degrees to about 140 degrees.

In another embodiment, the paint supply passage includes a receiving passage portion oriented generally co-axially with the receiving neck portion axis and a discharge passage portion oriented generally co-axially with the discharge neck portion axis. In some embodiments, the receiving passage portion has a substantially constant first diameter; and the discharge passage portion includes a tapered portion tapering from the first diameter to a second diameter smaller than the first diameter. In some embodiments, the first diameter is in a range of from about 20 mm to about 30 mm; and the second diameter is in a range of from about 5 mm to about 10 mm.

In another embodiment, the paint inlet includes a threaded internal inlet bore co-axial with the receiving neck portion axis for connection of the paint neck to a paint supply. In another embodiment, a mounting flange is defined on a proximal end of the receiving neck portion for mounting the apparatus in a fixture adjacent the moving strand.

In another embodiment, the discharge neck portion includes a cylindrical outer surface on a distal end portion of the discharge neck portion; the paint head includes a collar concentrically received about the cylindrical outer surface of the distal end portion; and the apparatus further includes an O-ring seal between the cylindrical outer surface of the distal end portion and the collar.

In another embodiment, the paint neck includes a bend portion connecting the receiving neck portion and the discharge neck portion.

In another embodiment the paint wheel may be mounted on an axle received between two roller bearings on opposite sides of the paint wheel.

In another embodiment the paint neck may include a plurality of external reinforcing structures extending generally parallel to the receiving neck portion axis and the discharge neck portion axis.

In another aspect, the present disclosure relates to a method of applying a paint line to a moving strand of a tire component, the method comprising the steps of:

(a) holding a paint applier such that a discharge neck portion axis of a discharge neck portion of the paint applier is within 10 degrees of parallel to a direction of travel of the moving strand with the discharge neck portion pointed generally downstream in the direction of travel;

(b) touching a paint wheel of the paint applier to the moving strand so that the paint wheel rotates downward to carry paint downward to the moving strand and to carry any excess paint back up into the paint applier in a return direction opposite to the direction of travel; and (c) holding the paint applier such that an inlet end of the paint applier is oriented upwardly by at least about 35 degrees from horizontal to receive a gravity feed of paint.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

Figure 1:
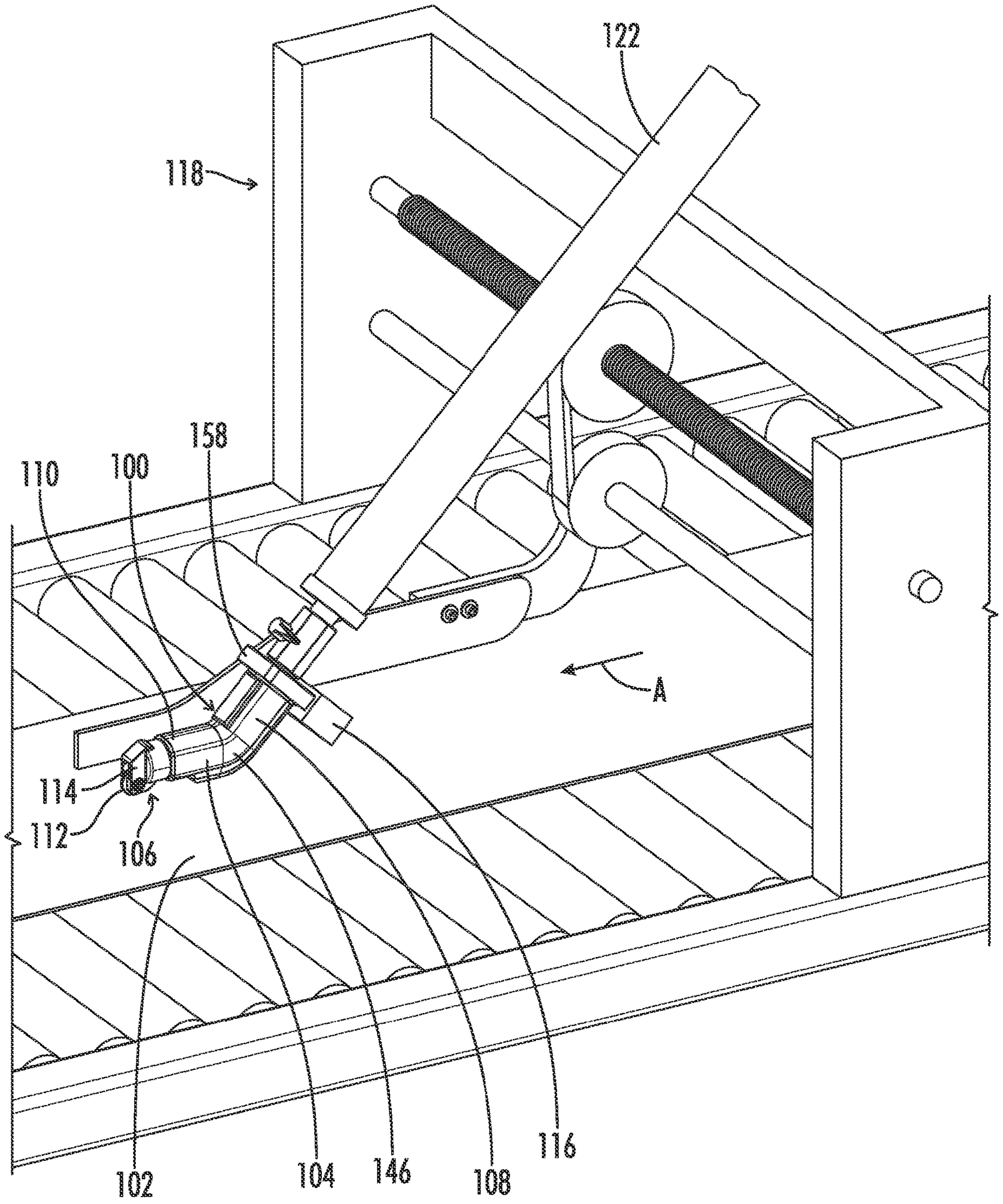
FIG. 1 is a side perspective view of an embodiment of the paint applicator apparatus and paint machine.

FIG. 1 illustrates a paint applicator apparatus 100 for applying a paint line to a moving strand of a tire component 102. The paint applicator apparatus 100 includes a paint neck 104 and a paint head 106. The paint neck 104 includes a receiving neck portion 108 and a discharge neck portion 110. The paint head 106 includes a rotatable paint wheel 112 and a collar 114. The paint applicator apparatus 100 is held in place by a fixture 116 of a paint machine 118 such that the discharge neck portion 110 is substantially parallel to the moving strand of the tire component 102. The fixture 116 can adjust the position of the paint applicator apparatus 100 relative to the moving strand 102, both vertically and across the width of the moving strand 102.

Figure 2:
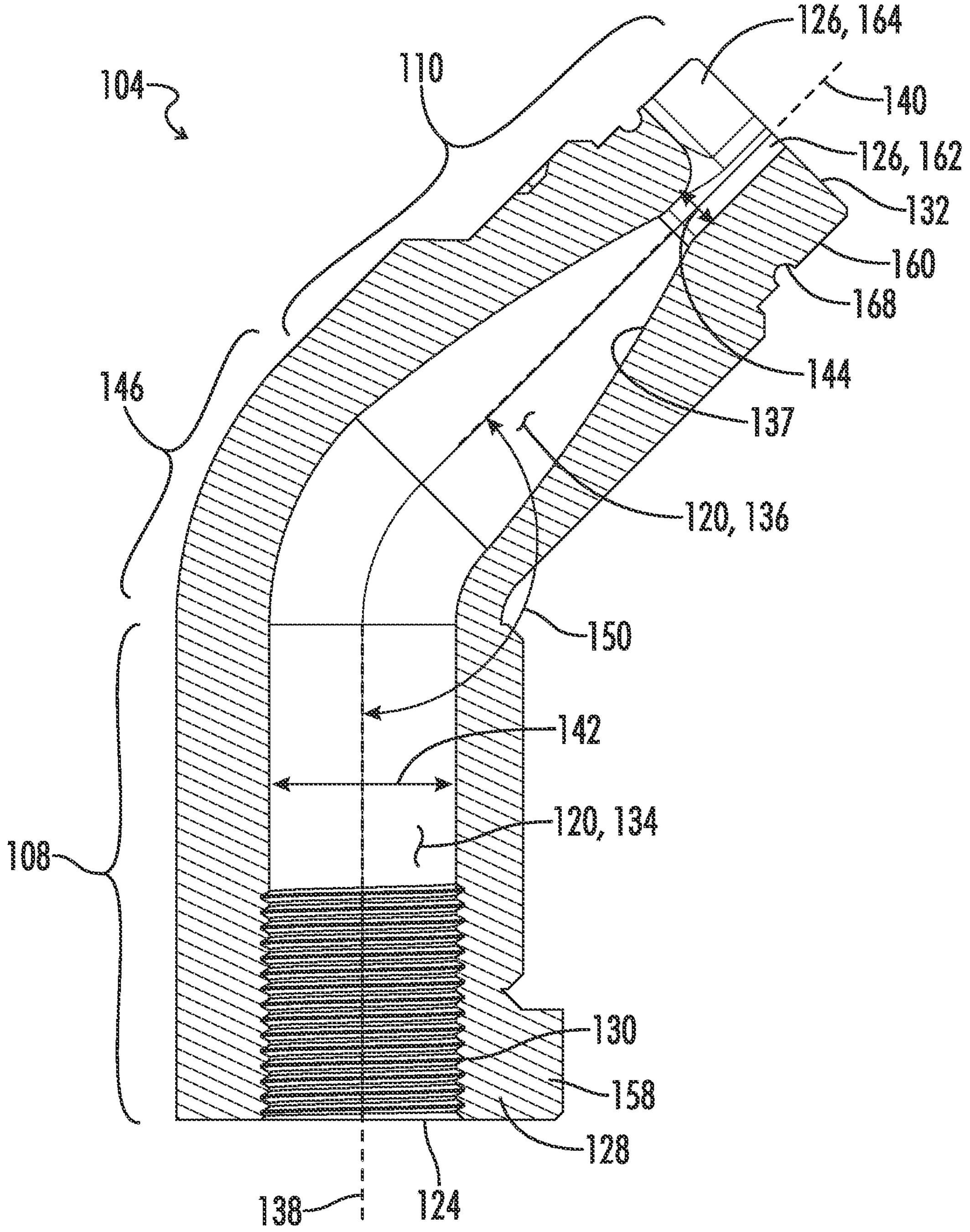
FIG. 2 is cross-section view of a paint neck of the paint applicator of FIG. 1 taken along an axial plane of the paint applicator.

The paint neck 104 further includes a paint supply passage 120, as shown in FIG. 2. The paint supply passage 120 is configured for receiving and discharging the paint received from the paint supply 122 shown in FIG. 1. The paint supply passage 120 includes the paint inlet 124 defined in the receiving neck portion 108 and a paint outlet 126 defined in the discharge neck portion 110. In some embodiments, the paint inlet 124 may further be defined in the neck proximal end 128. The paint inlet 124 may also have a threaded internal bore surface 130 for connecting to the paint supply 122. In some embodiments, the paint outlet 126 may further be defined in the neck distal end 132. The paint supply passage 120 may further include a receiving passage portion 134 and a discharge passage portion 136. The receiving passage portion 134 may be oriented generally co-axially with the receiving neck portion axis 138 and the discharge passage portion 136 may be oriented generally co-axially with the discharge neck portion axis 140. In some embodiments, such as the one shown in FIG. 2, the receiving passage portion 134 has a substantially constant diameter 142. The discharge passage portion 136 includes a tapered portion 137 which tapers from that diameter 142 to a smaller, second diameter 144. In some embodiments, the diameter 142 may be about 20 mm to 30 mm while the second diameter 144 may be about 5 mm to 10 mm.

The paint neck 104 is configured such that the receiving neck portion 108 and the discharge neck portion form an obtuse angle 150. Due to the angle between the receiving neck portion 108 and the discharge neck portion 110, the receiving neck portion 108 and the discharge neck portion 110 are connected by a bend portion 146 of the paint neck 104.

Figure 4:
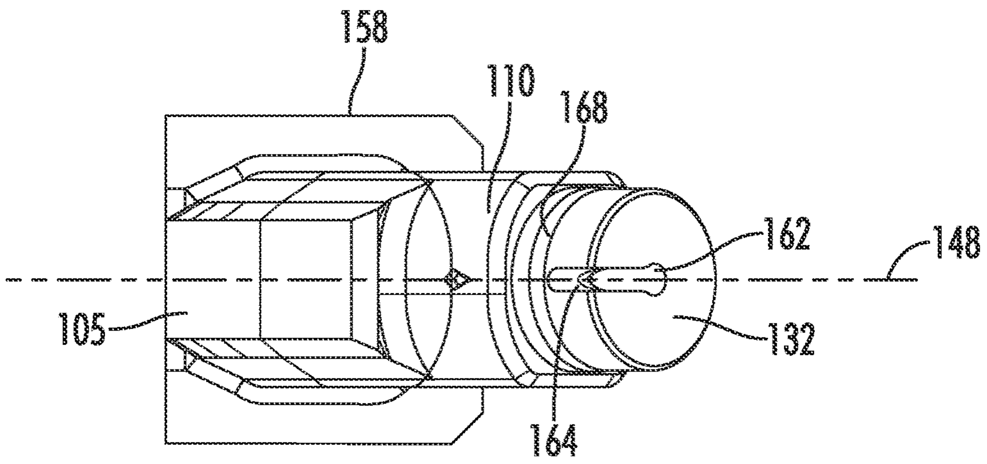
FIG. 4 is a discharge end view of the paint neck of FIG. 2.

The receiving neck portion 108 defines a receiving neck portion axis 138 and a neck proximal end 128 and the discharge neck portion 110 defines a discharge neck portion axis 140 and a neck distal end 132. The receiving neck portion axis 138 and the discharge neck portion axis 140 form an axial plane 148 (see FIG. 4). The angle 150 between the receiving neck portion 108 and the discharge neck portion 110 is defined by the receiving neck portion axis 138 and the discharge neck portion axis 140.

The angle 150 is preferably an obtuse angle and is configured such that the discharge neck portion 110 is substantially parallel to the moving strand of the tire component 102 when the receiving neck portion 108 is attached to the fixture 116 of the paint machine 118. In some embodiments, the angle 150 may more specifically be from 120 degrees to 150 degrees, and more preferably from 130 degrees to 140 degrees.

Figure 3:
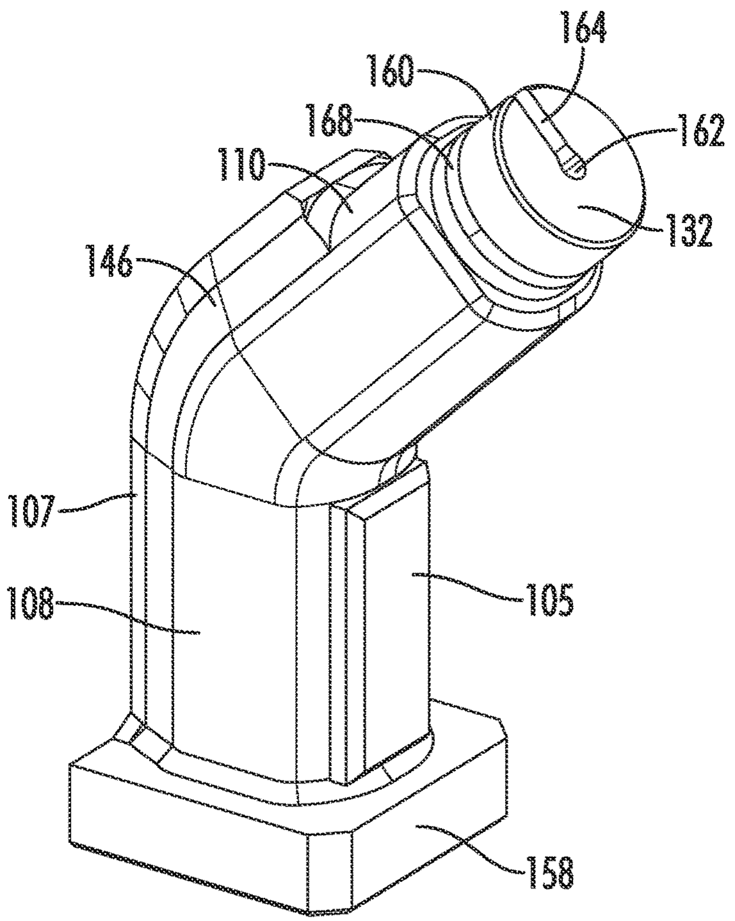
FIG. 3 is a perspective view of the paint neck of FIG. 2.

As best seen in FIG. 3 the paint neck 104 includes a plurality of external reinforcing structures 105 and 107. The structure 105 extends generally parallel to the receiving neck portion axis 138. The structure 107 extends generally parallel to the receiving neck portion axis 138 and the discharge neck portion axis 140.

In one embodiment, the receiving neck portion 108 is substantially upwardly oriented when it is attached to the fixture 116 of the paint machine 118 that is adjacent to the moving strand of the tire component 102. By "substantially upwardly oriented" it is meant that the receiving neck portion axis 138 is at an angle of at least 35 degrees to horizontal. The receiving neck portion 108 may include a flange 158 on the neck proximal end 128 of the receiving neck portion 108 for mounting the paint applicator apparatus to the fixture 116. This generally upward orientation of the receiving neck portion 108 allows the paint applicator apparatus 100 to receive a gravity feed of paint from the paint supply 122.

As shown in FIGS. 2 and 3, some embodiments of the discharge neck portion 110 may further include reduced diameter cylindrical outer surface 160, a discharge end opening 162 to the paint outlet 126, and a slot 164. Slot 164 may also be referred to as a paint outlet slot 164. The reduced diameter cylindrical outer surface 160 is located on the distal end of the discharge neck portion 110 and is configured to receive the paint head 106. An O-ring 166 may also be received in a groove 168 in the reduced diameter cylindrical outer surface 160 to form a seal between the discharge neck portion 110 and the paint head 106. The discharge end opening 162 may be co-axial with the discharge neck portion axis 140 and communicated with the neck distal end 132 of the discharge neck portion 110. The slot 164 is communicated with the discharge end opening 162 and an external surface of the discharge neck portion 110, which external surface may be the reduced diameter cylindrical outer surface 160. The slot may also lie substantially parallel to and in the axial plane 148. As is further explained below the slot 164 serves as a reservoir which holds paint that is carried to the moving strand by the paint wheel 112, and receives excess paint carried back into the paint head by the paint wheel.

Figure 5:
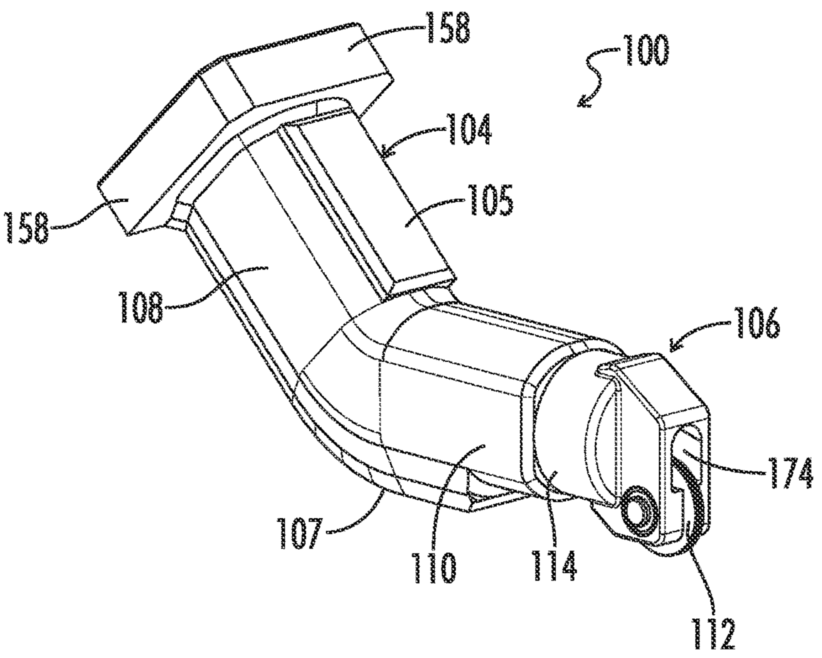
FIG. 5 is a perspective view of the paint neck of FIG. 2 assembled with a paint head.
Figure 6:
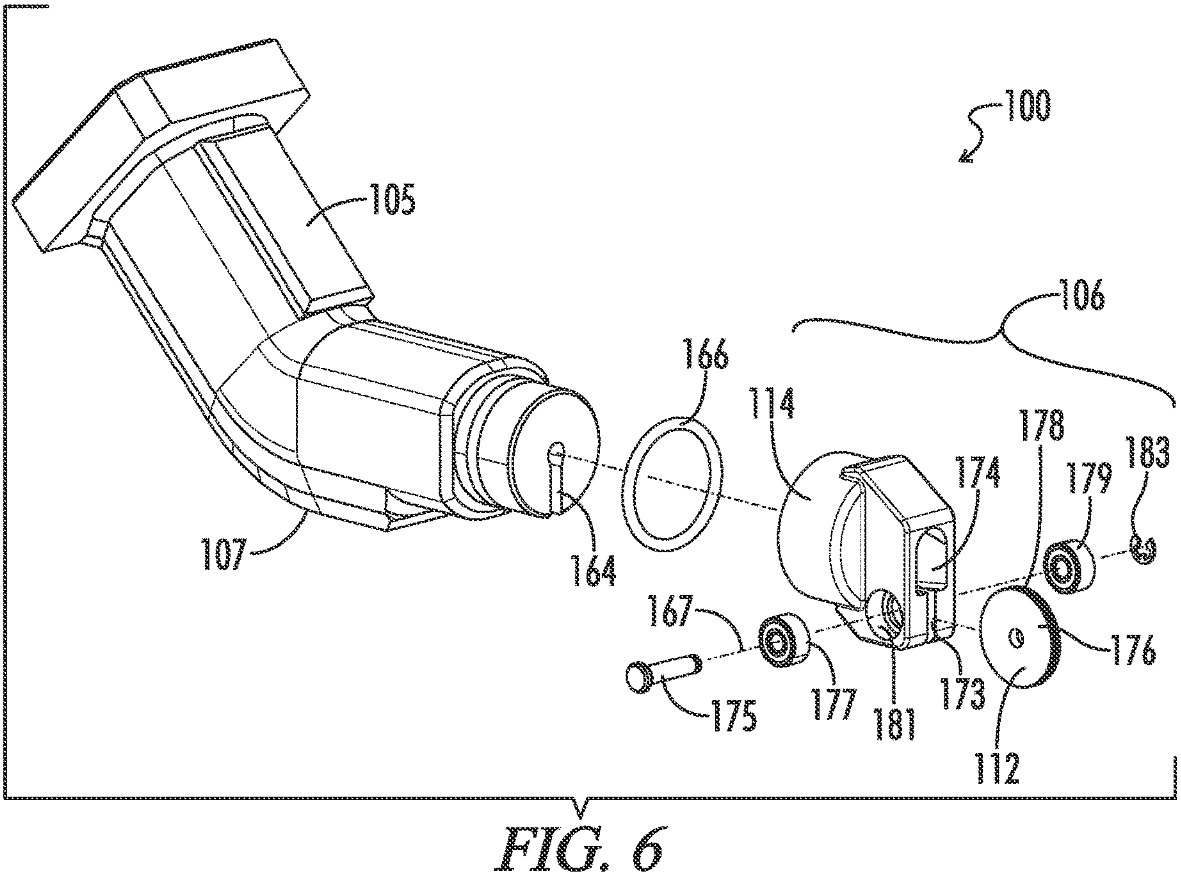
FIG. 6 is an exploded view of the paint neck and paint head of FIG. 5.
Figure 7:
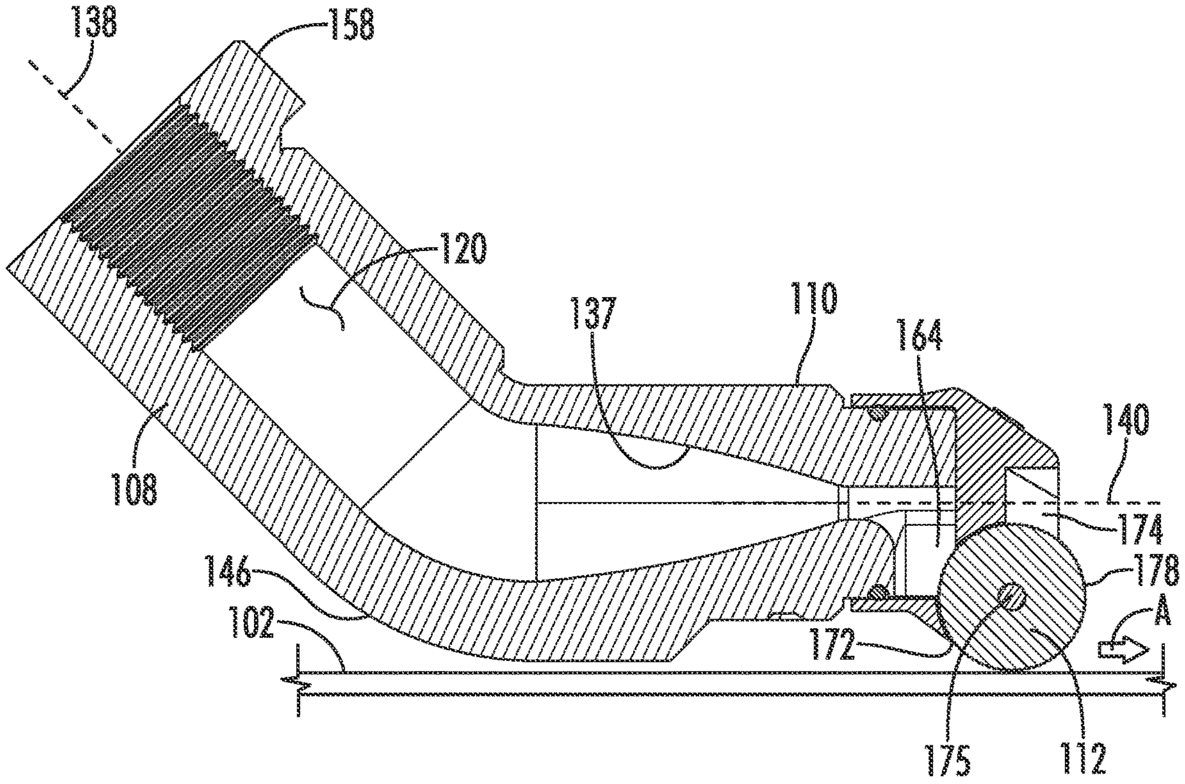
FIG. 7 is a cross-section view of the assembled paint neck and paint head of FIG. 5 with the discharge neck portion of the paint neck oriented generally parallel to the moving strand of tire material.

The paint head 106, as best shown in FIGS. 5-7 is coupled to the discharge neck portion 110. As shown in FIGS. 5-7, the paint head 106 includes the rotatable paint wheel 112, a collar 114, and a paint head inlet 170. The paint head inlet 170 is an open end of the collar 114 and leads to an inner cylindrical surface 171 of the collar 114 which is closely received about the reduced diameter cylindrical outer surface 160 and is sealed by the O-ring 166.

Figure 8:
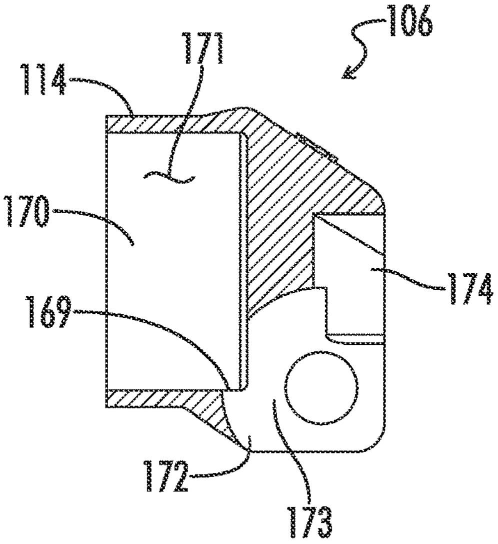
FIG. 8 is a cross-section view of the paint head taken along the axial plane of the paint applicator.

As best seen in FIG. 8 the paint head 106 includes a paint head slot 173 which intersects the cylindrical bore 171. When the paint head 106 is assembled with the paint neck 104 the paint head slot 173 is aligned with the slot 164 of the paint neck 104 and the paint wheel 112 is mounted within the paint head slot 173 and also partially extends into the slot 164. As best shown in FIG. 6 the paint wheel 112 is mounted on an axle 175 which is received in two roller bearings 177 and 179 which are received in cylindrical recesses such as 181 on opposite sides of the paint head 106. A keeper ring 183 holds the axle 175 in place when the paint head 106 is assembled. The axle 175 defines a wheel axis 167 of paint wheel 112. The wheel axis 167 is normal to the axial plane 148.

As can best be seen in FIGS. 7 and 8, when the paint wheel 112 is assembled with the paint head 106 and the distal neck portion 110 is held generally horizontally with the moving tire strand 102 moving below the paint applicator apparatus 100 in the direction generally shown by arrow A, the paint wheel 112 rotates counter-clockwise as seen in FIG. 7 and carries paint from the slot 164 through a small clearance 172 between the paint head slot 173 and the paint wheel 112, which clearance 172 may also be referred to as a paint head outlet 172. The paint is primarily carried on a periphery 178 of paint wheel 112, which periphery 178 is preferably serrated to aid in holding the paint. The periphery 178 of paint wheel 112 engages the moving strand 102 and deposits a stripe of paint on the moving strand. Any excess paint remaining on the paint wheel 112 is carried back up by the rotating wheel 112 into an excess paint inlet 174 of paint head 106 and back into the slot 164.

The paint head 106 is coupled to the discharge neck portion 110 such that the paint wheel 112 lies substantially parallel to and in the axial plane 148, which will typically result in the paint wheel 112 being oriented vertically and perpendicularly to the moving strand of the tire component 102.

The paint wheel 112 further includes opposed parallel wheel sides 176 configured to be closely received in the paint head slot 173. In this configuration, paint is primarily carried by the surface 178, also referred to as the periphery, of the paint wheel 112 as the paint wheel rotates downwardly through the paint outlet slot 164 and the paint head slot because the edges 169 (see FIG. 8) of the paint head slot 173 at its intersection with the paint outlet slot 164 wipe the paint off the wheel sides 176 as the paint wheel 112 rotates.

The configuration shown in FIG. 1 where the discharge neck portion 110 is substantially parallel to the moving strand of the tire component 102 helps to regulate the flow of paint so that there is not too much paint applied to the moving strand of the tire component 102. When a paint applicator deposits too much paint, excess paint builds up at the application location or will collect on the paint wheel such that paint will drip off the paint wheel 112. Both situations result in an error in the tread line. But better regulating the flow of the paint reduces these errors and creates more consistent and accurate tread lines on the moving strand of the tire component 102.

A method of applying a paint line to the moving strand of the tire component 102 includes a number of steps for orienting the paint applicator apparatus to take advantage of these benefits. First, the paint applicator apparatus 100 is held by a fixture 116 of the paint machine 118. The paint applicator apparatus 100 is configured to be held such that the discharge neck portion axis 154 of the discharge neck portion 110 is within 10 degrees of parallel to a direction of travel A of the moving strand of the tire component 102. Plus or minus 10 degrees of parallel may be considered to be "generally parallel" to the moving strand 102. The direction of travel A is shown in FIGS. 1 and 7. The paint applicator apparatus 100 may further be held such that the discharge neck portion 110 is pointed generally downstream in the direction of travel A of the moving strand of the tire component 102.

Second, the paint wheel 112 is oriented such that the paint wheel 112 is touching the moving strand of the tire component 102 so that the paint wheel 112 rotates downward out of the slot 164 and out of the paint head slot 173. Both slots 164 and 173 extend radially from the discharge neck portion axis 140. As the paint wheel 112 rotates, the paint wheel carries paint downward through the slots 164 and 173 to the moving strand of the tire component 102 and carries any excess paint back up into the paint head 106, more specifically the excess paint inlet 174, in a return direction opposite to the direction of travel A of the moving strand of the tire component 102.

Third, the paint applicator apparatus 100 is held by the fixture 116 of the paint machine 118 such that the inlet 124 of the paint receiving neck portion 108 is oriented upwardly by at least about 35 degrees from horizontal to receive a gravity feed of paint. Finally, as the paint supply 122 supplies the paint, the paint passes through the paint supply passage 120 to slot 164 so that the paint head 106 receives paint from the slot 164. The paint wheel 112 rotates through the slot 164 and picks up paint and carries the paint to the moving strand of the tire component 102 to apply a tread line to the tire component 102.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A paint applicator apparatus for applying a paint line to a moving strand of a tire component, comprising:

a paint neck, including:

a receiving neck portion extending along a receiving neck portion axis;

a discharge neck portion extending along a discharge neck portion axis;

a paint supply passage defined through the paint neck and including a paint inlet defined in the receiving neck portion and a paint outlet defined in the discharge neck portion;

wherein the receiving neck portion axis and the discharge neck portion axis define an obtuse angle therebetween so that the discharge neck portion axis can be oriented substantially parallel to the moving strand while the receiving neck portion axis is oriented at an upwardly directed angle relative to the moving strand to receive a gravity feed of paint; and a paint head coupled to the discharge neck portion, the paint head including a rotatable paint wheel configured to carry paint from the paint outlet to the moving strand.

2. The paint applicator apparatus of claim 1, wherein:

the receiving neck portion axis and the discharge neck portion axis define an axial plane of the paint neck; and the rotatable paint wheel lies substantially parallel to and in the axial plane and rotates about a wheel axis normal to the axial plane.

3. The paint applicator apparatus of claim 2, wherein:

the paint outlet includes a paint outlet slot communicating the paint supply passage with an external surface of the discharge neck portion, the paint outlet slot lying substantially parallel to and in the axial plane; and the rotatable paint wheel extends partially into the paint outlet slot so that when the discharge neck portion is pointed in a direction of travel of the moving strand and the paint wheel is engaged with the moving strand the paint wheel rotates downward out of the paint outlet slot to carry paint from the paint outlet slot down to the moving strand and the paint wheel carries excess paint back up into the paint head.

4. The paint applicator apparatus of claim 3, wherein:

the paint head includes a paint head slot communicated with the paint outlet slot; and the paint wheel includes opposed parallel wheel sides closely received in the paint head slot so that as the wheel rotates downwardly through the paint head slot paint is primarily carried by a periphery of the paint wheel and paint is wiped off the wheel sides by edges of the paint head slot.

5. The paint applicator apparatus of claim 1, wherein:

the obtuse angle is in a range of from about 120 degrees to about 150 degrees.

6. The paint applicator apparatus of claim 1, wherein:

the obtuse angle is in a range of from about 130 degrees to about 140 degrees.

7. The paint applicator apparatus of claim 1, wherein:

the paint supply passage includes a receiving passage portion oriented generally co-axially with the receiving neck portion axis and a discharge passage portion oriented generally co-axially with the discharge neck portion axis.

8. The paint applicator apparatus of claim 7, wherein:

the receiving passage portion has a substantially constant first diameter; and the discharge passage portion includes a tapered portion tapering from the first diameter to a second diameter smaller than the first diameter.

9. The paint applicator apparatus of claim 8, wherein:

the first diameter is in a range of from about 20 mm to about 30 mm; and the second diameter is in a range of from about 5 mm to about 10 mm.

10. The paint applicator apparatus of claim 1, wherein:

the paint inlet includes a threaded internal inlet bore co-axial with the receiving neck portion axis for connection of the paint neck to a paint supply.

11. The paint applicator apparatus of claim 1, wherein:

the discharge neck portion includes a cylindrical outer surface on a distal end portion of the discharge neck portion;

the paint head includes a collar concentrically received about the cylindrical outer surface of the distal end portion; and the paint applicator apparatus further includes an O-ring seal between the cylindrical outer surface of the distal end portion and the collar.

12. The paint applicator apparatus of claim 1, further comprising:

a mounting flange defined on a proximal end of the receiving neck portion for mounting the paint applicator apparatus in a fixture adjacent the moving strand.

13. The paint applicator apparatus of claim 1, wherein: the paint neck includes a bend portion connecting the receiving neck portion and the discharge neck portion.

14. The paint applicator apparatus of claim 1, wherein: the paint head includes an axle received in two roller bearings on opposite sides of the paint wheel, the paint wheel being mounted on the axle.

15. The paint applicator apparatus of claim 1, wherein: the paint neck includes a plurality of external reinforcing structures extending generally parallel to the receiving neck portion axis.

* * * * *